United States Patent
Laura

[19]

[11] Patent Number: 5,880,190
[45] Date of Patent: *Mar. 9, 1999

[54] AQUEOUS COATING COMPOSITION

[75] Inventor: Alger E. Laura, New Boston, Mich.

[73] Assignee: A-Line Products Corporation, Detroit, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 955,315

[22] Filed: Oct. 21, 1997

Related U.S. Application Data

[63] Continuation of Ser. No. 479,176, Jun. 7, 1995, Pat. No. 5,756,566, which is a continuation-in-part of Ser. No. 384,783, Feb. 7, 1995, Pat. No. 5,804,640, and a continuation-in-part of Ser. No. 384,782, Feb. 7, 1995, Pat. No. 5,629,046, and a continuation-in-part of Ser. No. 384,770, Feb. 7, 1995, Pat. No. 5,620,747, and a continuation-in-part of Ser. No. 384,775, Feb. 7, 1995, Pat. No. 5,626,915, each is a continuation of Ser. No. 220,729, Mar. 31, 1994, Pat. No. 5,427,856, which is a continuation of Ser. No. 20,654, Feb. 22, 1993, Pat. No. 5,300,363, which is a continuation of Ser. No. 599,664, Oct. 18, 1990, Pat. No. 5,227,198, which is a continuation-in-part of Ser. No. 340,845, Apr. 20, 1989, abandoned.

[51] Int. Cl.$^6$ ............... C08J 3/00; C08K 5/17; C08K 5/05; C08L 75/00

[52] U.S. Cl. ............... 524/236; 523/406; 523/415; 524/186; 524/247; 524/249; 524/379; 524/380; 524/386; 524/388; 524/463; 524/472; 524/507; 524/591; 524/839; 524/840; 525/123; 525/129; 525/455

[58] Field of Search ............... 523/406, 415; 524/186, 236, 247, 249, 379, 380, 386, 388, 463, 464, 472, 507, 591, 839, 840; 525/123, 129, 455

[56] References Cited

U.S. PATENT DOCUMENTS

| | | | |
|---|---|---|---|
| 2,998,324 | 8/1961 | Hirt | 117/47 |
| 3,218,189 | 11/1965 | Tyler | 117/47 |
| 3,317,330 | 5/1967 | Livingston et al. | 106/287 |
| 3,579,485 | 5/1971 | Folzenlogen et al. | 260/78.4 D |
| 3,849,148 | 11/1974 | Temple | 106/287 SB |
| 4,028,329 | 6/1977 | Kahn et al. | 260/425 B |

(List continued on next page.)

FOREIGN PATENT DOCUMENTS

| | | |
|---|---|---|
| 68814 | 2/1966 | Belgium . |
| 1266339 | 2/1990 | Canada . |
| 032861 | 2/1989 | European Pat. Off. . |
| 3338582 A 1 | 4/1984 | Germany . |
| 1113277 | 5/1968 | United Kingdom . |
| 2131439 A | 6/1984 | United Kingdom . |
| WO 8911494 | 11/1989 | WIPO . |
| Wo 9012056 | 10/1990 | WIPO . |

OTHER PUBLICATIONS

EMCO Chemical Corp., "Technical Data Sheet for Polycoat Low Chlorinated Polypropylene" (no date).

Supplementary Search Report dated Jun. 18, 1993 (with claims for EP 90906604).

Eastman Chemical Products, Inc., Material Safety Data Sheet for Chlorinated Polyolefin XCP 343–1 (100 %).

Eastman Coatings Chemicals Publication No. GN–319A (Sep., 1978) "Chlorinated Polyolefin CP–153–2".

Eatman Chemicals Publication No. GN–355 (Nov., 1983) "Chlorinated Polyolefin CP 343–1 (100 %)."

Toyo Kasei Kogyo Co., Ltd. Material Safety Data Sheet for "Hardlen" (Chlorinated Polypropylene), 1985.

Eatman$^{200}$ Chlorinated polyolefin CP–343–3, pamphlet.

*Primary Examiner*—Patrick D. Niland
*Attorney, Agent, or Firm*—Harness, Dickey & Pierce, P.L.C.

[57] ABSTRACT

A water-based coating composition and methods of making and using the same are disclosed. It is suitable for coating a variety of substrates including polyolefinic substrates such as polypropylene, and operates without aromatic organic solvents.

9 Claims, 1 Drawing Sheet

U.S. PATENT DOCUMENTS

| | | | |
|---|---|---|---|
| 4,046,587 | 9/1977 | Guglielmo, Sr. | 106/271 |
| 4,070,421 | 1/1978 | Etter, Jr. | 260/897 |
| 4,122,055 | 10/1978 | Tugukuni et al. | 260/29.4 UA |
| 4,144,363 | 3/1979 | Balloni et al. | 427/358 B |
| 4,214,039 | 7/1980 | Steiner et al. | 428/414 |
| 4,246,319 | 1/1981 | Jacobone | 428/413 |
| 4,263,411 | 4/1981 | Bak | 521/108 |
| 4,303,697 | 12/1981 | Baseden | 427/54.1 |
| 4,314,918 | 2/1982 | Birkmeyer et al. | 260/20 |
| 4,317,894 | 3/1982 | Lewarchik et al. | 525/455 |
| 4,343,925 | 8/1982 | Chang et al. | 525/440 |
| 4,417,022 | 11/1983 | Chang et al. | 524/598 |
| 4,567,109 | 1/1986 | Sano et al. | 428/413 |
| 4,710,408 | 12/1987 | Kraus | 427/393.5 |
| 4,863,988 | 9/1989 | Inagaki et al. | 524/315 |
| 4,954,573 | 9/1990 | Fry et al. | 525/327.6 |
| 4,981,730 | 1/1991 | Zaleski | 427/393.5 |
| 5,227,198 | 7/1993 | Laura et al. | 427/373 |
| 5,288,780 | 2/1994 | Jarzombek et al. | 524/127 |
| 5,298,552 | 3/1994 | Borghi et al. | 524/519 |
| 5,300,326 | 4/1994 | Zezinka et al. | 427/385.5 |
| 5,300,363 | 4/1994 | Laura et al. | 428/413 |
| 5,373,048 | 12/1994 | Witzman et al. | 524/458 |
| 5,397,602 | 3/1995 | Martz et al. | 427/343.5 |
| 5,427,856 | 6/1995 | Laura et al. | 428/413 |
| 5,500,246 | 3/1996 | Morizono et al. | 427/239 |
| 5,545,696 | 8/1996 | Rardon et al. | 525/375 |
| 5,620,747 | 4/1997 | Laura et al. | 427/385.5 |
| 5,626,915 | 5/1997 | Laura et al. | 427/385.05 |
| 5,629,049 | 5/1997 | Laura et al. | 427/385.5 |

AQUEOUS COATING COMPOSITION

CROSS REFERENCE TO RELATED APPLICATIONS

This application is a continuation of Ser. No. 08/479,176, filed Jun. 7, 1995, (now U.S. Pat. No. 5,756,566) which is a continuation-in-part application of each of four applications: U.S. Ser. No. 08/384,783, filed Feb. 7, 1995, (now U.S. Pat. No. 5,804,640) U.S. Ser. No. 08/384,782 filed Feb. 7, 1995 (now U.S. Pat. No. 5,629,046), U.S. Ser. No. 08/384,770, filed Feb. 7, 1995 (now U.S. Pat. No. 5,620,747), and U.S. Ser. No. 08/384,775, filed Feb. 7, 1995 (now U.S. Pat. No. 5,626,915); all four of which are continuations of U.S. Ser. No. 08/220,729, filed Mar. 31, 1994 (now U.S. Pat. No. 5,427,856), which is a continuation of U.S. Ser. No. 08/020,654, filed Feb. 22, 1993 (now U.S. Pat. No. 5,300,363), which is a continuation of U.S. Ser. No. 599,664, filed Oct. 18, 1990 (now U.S. Pat. No. 5,227,198), which is a continuation-in-part of International Application No. PCT/US90/02005, filed Apr. 18, 1990, which is a continuation-in-part of U.S. Ser. No. 340,845, filed Apr. 20, 1989; now abandoned, said parent applications being expressly incorporated herein by reference.

BACKGROUND AND SUMMARY OF THE INVENTION

This invention relates to coating compositions and systems, and more particularly to aqueous or water-base coating compositions, and methods of making and using the same.

Coating untreated polyolefin-containing substrates, such as polypropylene substrates, is generally difficult because of poor adhesion of coatings to this type of substrate.

In an effort to solve this problem, polyolefinic and other similar plastic or synthetic substrates have been typically coated with coating systems employing an organic solvent base. While the use of organic solvents appears to assist, to some degree, the organic contents of the coatings often render the coating composition or system undesirable from a number of aspects. For example, most organic solvents are derived from petroleum products, and thus are generally expensive and in short supply. Further, unless suitable costly recovery or disposal procedures are used, organic solvents, such as the commonly used aromatic organic solvents, may create a potential pollution problem.

Other popularly employed coatings include chromium-containing coatings. And like petroleum-based systems, unless properly controlled costly recovery or treatment methods are also employed, chromium-containing coatings are also potentially undesirable from an environmental standpoint.

Aqueous-based primer coatings, additionally employing substantial levels of aromatic organic solvents, have been suggested in the art. For example, such compositions have been disclosed by manufacturers or distributors such as Eastman Chemical Corp. Likewise Emco Chemical Corporation has disclosed a primer for polypropylene that includes, as initial ingredients 25% by weight of a chlorinated polyolefin having a chlorine content of 30% (25% in xylene), 24.925% toluene, 0.025% sulfonated castor oil, 0.050% sodium lauryl sulfate, and 50.000% deionized water (as a final ingredient).

U.S. Pat. No. 4,954,573 (incorporated by reference) discloses a chlorinated polyolefin composition for use as a primer or coating or various types of substrates, such as polyolefins.

The use of chlorinated polyolefin materials as a primer for polyolefin substrates has also been proposed. For instance, U.S. Pat. No. 4,303,697 (incorporated by reference) discloses priming a polyolefinic substrate with a chlorinated polymeric material, such as chlorinated polypropylene, containing carboxylic acid anhydride groups, and exposing the primed substrate to ultraviolet radiation.

U.S. Pat. No. 4,070,421 (incorporated by reference) discloses chlorinated polyolefinic compositions useful as primers for adhesion improvement of decorative or protective coatings to polyolefins.

U.S. Pat. No. 3,579,485 (incorporated by reference) discloses chlorinated carboxyl group-containing poly-$\alpha$-olefins, which form primer coatings for use on untreated poly-$\alpha$-olefin substrates, and halve aromatic solvents as a preferred solvent.

The following United States patents, which are incorporated by reference herein, relate more generally to coating compositions for substrates, including coating compositions for polyolefin substrates: U.S. Pat. Nos. 4,710,408; 4,567,106; 4,417,022; 4,343,925; 4,317,894; 4,314,918; 4,263,411; 4,246,319; 4,214,039; 4,144,363; 4,046,587; 4,028,329; 3,849,148; 3,317,330; 3,218,189; and 2,998,324.

It is therefore an object of the present invention to provide an aqueous-based coating composition, with a reduced level of, or substantially free of, volatile organic components ("VOC's") or solvents (such as aromatic organic solvents) for coating substrates such as polyolefin-containing substrates.

The compositions and methods of the present invention preferably employ: (a) a resin; (b) an ethylene glycol; (c) a surfactant; (d) an aliphatic amine; and (e) water. In another embodiment the compositions and method further employ a thickening agent, a filler, or both.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

Figure 1A:
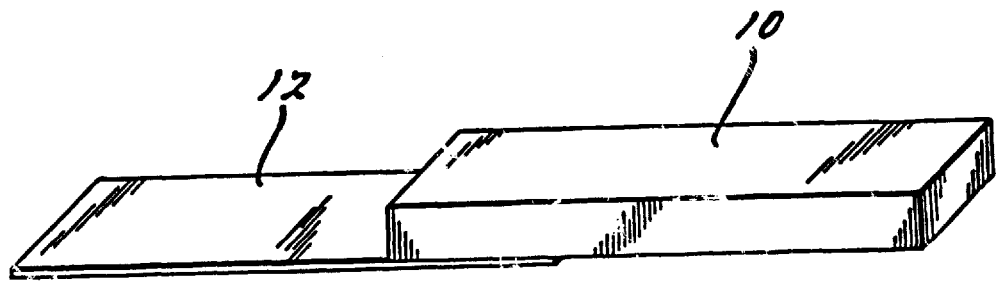
FIG. 1 illustrates how samples prepared according to the methods of the present invention are tested.

The present invention comprises aqueous or water-based coating compositions or systems useful in coating polyolefinic-containing substrates. The compositions are also useful in coating other troublesome metallic and synthetic substrates, i.e., substrates that are difficult to coat with good adhesion. The compositions or systems preferably comprise:

(i) a polyol;
(ii) a surfactant, such as a non-ionic surfactant;
(iii) a halogenated polyolefinic resin material or other similar halogenated resin, such as a PVC resin;
(iv) an aliphatic amine, such as an amino-substituted alkanol; and
(v) water.

In another preferred embodiment, the compositions or systems further comprise, in addition to the above, a thickening agent, a filler, or both.

In another preferred embodiment, the compositions or systems comprise a carbon black dispersion.

In another preferred embodiment, the compositions or systems comprise a mixture comprising an acrylic and a polyurethane.

The compositions can be used to efficaciously coat polyolefinic-like substrates while employing substantially reduced levels of volatile organic solvents or volatile organic components (VOC's). In a preferred embodiment, the compositions and systems of the present invention contain very low levels or is substantially free of volatile organic solvents, especially aromatic solvents, such as benzene, xylenes, toluene, or similar materials or components. In a highly preferred embodiment, the compositions and systems of the present invention are substantially-free of volatile organic components or materials, especially aromatic organic solvents such as benzene, toluene, xylene, and the like.

The coatings provided by the compositions and methods of the present invention may be decorative, protective, or act as a base or pre-treatment for another coating or treatment step to come; they may also be employed to perform two or more of these functions.

They may be applied or deposited by any convenient method, such as spraying, dipping, roller-coating, electrostatic deposition, or the like.

While it may have other functions as well, (and without intending to be bound by theory) the polyols employed in the compositions and methods of the present invention are used primarily, without limitation, as coalescing agents. The polyols employed in the methods and compositions of the present invention are preferably distillable polyols. Thus, several different classes of polyols are suitable for use in the compositions and methods of the present invention.

The polyols may be any suitable polyol having any suitable chain length or —OH functionality. The preferred polyols for use in the present invention are glycol-type polyols, and still more preferably are alkylene polyols (e.g. ethylene polyols). In particular, preferred glycol-type polyols include alkylene glycols, such as ethylene glycol, diethylene glycol, triethylene glycol, tetraethylene glycol, propylene glycol., dipropylene glycol, tripropylene glycol, and hexylene glycol as well as other glycols such as 1,3-butylene glycol, and ethoxytriglycol. Mixtures of two or more of these materials may also be employed. The most preferred glycols are alkylene glycols. Ethylene glycol is one of the most preferred.

Preferably the polyol is generally volatile and has a hydroxyl functionality of at least 2, and preferably about 2–6 hydroxy groups, per mole of polyol. Further, the polyol preferably has an average molecular weight of about 50 to about 500, more preferably about 62 to about 500, even more preferably about 62 to about 425, and still more preferably about 62 to about 250.

The final coating compositions or systems and methods of the present invention preferably employ the selected polyol at a level of between about 3% to about 40%, by weight of the final composition. In a more preferred embodiment, the polyol constitutes about 3% to about 20%, and still more preferably about 3% to about 10%. In one highly preferred embodiment the polyol comprises about 4.9% of the total weight of the final coating composition or system.

The selection of the resin for use in the compositions and methods of the present invention is extremely important. While the skilled artisan will appreciate that its selection will depend upon many factors, such as the nature of the ultimate surface to be coated (or related utility), processing conditions, the other components selected (i.e., the glycol, amine, surfactant, etc.), environmental concerns, costs, and the like, the following discussion relates to presently preferred materials.

The resins preferred for use in the composition and methods of the present invention include halogenated polyolefinic resin materials, as well as other art-disclosed halogenated materials and resins, such as PVC and related materials, and homo-, co- or terpolymers of such materials. It should be noted, however, that under certain conditions, non-halogen-containing resins may be employed, alone (as homopolymers) or as co- or terpolymers, along with halogenated materials. Rubbers may also be employed.

As noted, one class of preferred resins is halogenated polyolefinic materials. The halogenated polyolefinic materials preferred for use in the compositions and methods of the present invention are chlorinated polyolefinic materials. The chlorinated polyolefinic resin materials selected for use in the present coating compositions and methods should preferably have a chlorine content of from about 10 to about 40 weight percent, more preferably about 10 to about 30 weight percent, even more preferably about 18 to about 22 weight percent, and still more preferably about 19 to about 21 weight percent. In a present highly preferred embodiment, the chlorine content of a resin should comprise about 19.9 weight percent of the material.

The chlorinated resin, e.g., chlorinated polyolefin, may be supplied for use in the compositions or systems in any suitable form, with powder or pelletized forms being the preferred forms, and the powder form being the most preferred form.

The chlorinated polyolefin may be prepared according to known methods, such as those described in U.S. Pat. Nos. 4,070,421 and 4,954,573, which are hereby expressly incorporated by reference. For use in the present compositions and methods, the chlorinated polyolefin materials can be selected from commercially available materials such as those supplied by Eastman Chemical Company, Kingsport, Tenn. under the trade name CPO-343-1 (100%). Other commercially available materials that may be employed under certain conditions include PM 12075-OO, and 12075-OF, also supplied by Eastman Chemical Company, Kingsport, Tennessee, and CP-26P, CP-30P and CP-32P, products of Toyo Kasei Kogyo Co. Ltd., Osaka, Japan.

As noted in U.S. Pat. No. 4,070,421, the resins of the present invention can be admixed with other hydrocarbon-type resins; see Col. 2, 1. 15–38 of said '421 patent.

Preferably, the chlorinated polyolefins and other preferred chlorinated resins of the present compositions and methods have a melting point in the range of about 150° F. to about 350° F., more preferably about 150° F. to about 250° F., and still more preferably in the range of about 180° F. to about 210° F. Moreover, the preferred chlorinated polyolefins or other preferred chlorinated resins for use in the compositions and methods of the present invention have average molecular weights in the range of about 10,000 to about 40,000, more preferably about 10,000 to about 30,000, even more preferably about 15,000 to about 30,000, and still more preferably about 22,000 to about 29,000. The chlorinated polyolefins and other preferred chlorinated resins employed in the coating compositions and methods of the present invention preferably constitute about 0.5%. to about 30% (and perhaps as high as about 40%), more preferably about 2% to about 10%, still more preferably about 2% to about 5% by weight of the total composition. In one highly preferred embodiment, it is employed at a level of about 4.3%; in yet another it is about 10%.

Another group of useful resins, as noted above, include various polyvinyl resins, preferably chlorinated polyvinyl resins or PVC's; such materials also include PVC-like materials. Exemplary materials include polyvinyl alcohol, polyvinyl chloride, polyvinylidene chloride, and polyvinyl chloride-vinyl acetate or -maleic anhydride resins. Homo-, co- and terpolymeric materials made from such materials may be employed; mixtures of such materials may also be used.

Other similar useful materials include resins prepared from polyepichlorohydrins, brominated epoxies, all rubbers, and the like. These materials may be employed as homopolymers, copolymers and terpolymers; again, mixtures of such materials may also be employed.

As with the polyolefin materials described above, it is preferred that the final resin material employed in the compositions and methods of the present invention be chlorinated and have general physical properties similar to the olefinic materials. For example, an average molecular weight in the range of about 10,000 to about 30,000 is preferred. Likewise, it is highly preferred that at least a part of the final resin material be chlorinated and have a chlorine content of about 10 to about 30 percent. They are employed in the methods in similar fashions and in the compositions at similar levels.

The preferred compositions and methods of the present invention further include surface active agents, such as surfactants. Without intending to be bound by theory, the surface active agent serves primarily as an emulsifying agent in the present compositions. However, the surface active agent may also serve, without limitation, as an agent for wetting the surface of a material coated with the present coating compositions.

The surfactants preferred for use in the compositions and methods of the present invention include both high molecular weight (average molecular weight of 500 or more) and low molecular weight (average molecular weight of less than 500) nonionic, amphoteric, cationic and anionic materials. Polymeric surfactants may also be employed.

Exemplary nonionic materials include,. for example, organic materials which contain groups of varying polarity whereby one part of the molecule is hydrophilic and the other is hydrophobic. Examples of such materials include polyethylene polyols, polyvinyl alcohol, polyethers, polyesters and polyhalides. Preferably, the non-ionic surface active agent or other surface active agent selected is a surfactant and is present in an amount of about 0.05% to about 15%, more preferably about 0.05% to about 10%, still more preferably about 0.1% to about 10%, and still more preferably at a level of about 0.5% to about 7.0%, by weight of the total weight of the composition.

A highly preferred class of nonionic surface active agents or surfactants includes those that belong to the series of nonylphenoxy polyethoxy ethanol surfactants. In particular, these highly preferred surfactants preferably contain about 5 to about 25, and more preferably about 7 to about 15, and still more preferably about 7 to about 10 ethylene oxide groups per molecule of surfactant. Thus, commercial surfactants suitable for the present invention include, without limitation, Triton N-101™ manufactured by Rohm and Haas; as well as other commercially available materials such as Triton X-100, GAF CO-630 and Makon 10 manufactured by Stepan Chemical, Voeppe, France.

Alternative preferred surfactants include fluorosurfactant materials such as FC-129, 430 manufactured by Minnesota Mining and Manufacturing.

Exemplary anionic surface-active agents include materials such as those containing a carboxylate group attached directly to a hydrophobic group, or, in the alternative, where there is an intermediate functionality such as an ester, amide, sulfonamide, or the like. Other useful materials include anionic agents derived from sulfuric or sulfonic acids in which the hydrophobic groups are selected from aliphatic or aromatic groups of varying polarity, such as halides, hydroxyls, ether and/or ester groups. A preferred anionic material is a material such as sodium lauryl sulfate.

Exemplary cationic surface-active agents are those derived from amino groups (including primary; secondary; and/or tertiary amine salts) wherein the hydrophilic character is obtained by groups of varying polarity. Also exemplary are materials such as quaternary ammonium compounds, guanidine, and thiuronium salts.

Exemplary polymeric surfactants would include those manufactured by ICI Americas under the Tradename designations of Hypermer P52 and Hypermer P53.

As will be appreciated by the skilled artisan, there are a wide variety of such surface-active agents available. They are conveniently listed, by class, in "McCutcheon's Emulsifier's & Detergents," North American Edition, 1982, pp. 322–327, expressly incorporated herein by reference. They are employed in a similar fashion and at similar levels to the preferred non-ionic materials discussed above.

The preferred amines for use in the compositions and methods of the present invention include primary, secondary and tertiary aliphatic amines. In a highly preferred embodiment, the aliphatic amine has an amine functionality of between 1 and 3, and optionally contains other oxygen-containing functional groups as well. Preferred amines include primary, secondary and tertiary alkylamines, alkyldiamines, alkynolamines, dialkynolamines, and poly (oxyalkylene)diamines. A highly preferred group of amines further contains amines having one or more hydroxy or alkoxy (ether) groups and an average molecular weight in the range of about 50 to about 7,000.

A highly preferred group of amines are primary, secondary and tertiary aliphatic amines having a functionality of 1 to 3 and can be generally represented by the general formulae:

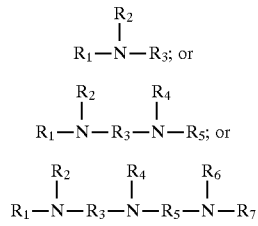

wherein $R_3$–$R_7$ are independently selected from H or straight or branched chain alkyl, hydroxyalkyl, or alkoxylalkyl groups of about 1 to about 20 carbon atoms; $R_1$–$R_7$ can additionally include a substituted alkyl group, i.e., where one or more of the carbons in the radical is replaced with or has substituted thereon another functionality, e.g., an amine, ether, hydroxy or -mercapto moiety, e.g., tris-(3-aminopropyl) amine.

Another group of highly preferred amines within the above classes are those primary, secondary or tertiary aliphatic amines of the above Formulae in which $R_1$-$R_7$ is specifically substituted with or contains one or more hydroxyl (—OH) functionalities.

Another group of preferred amines can be represented by the formulae:

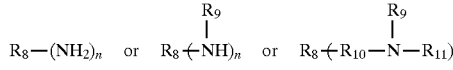

wherein n is 1 or 2 and $R_8$, $R_9$, $R_{10}$ and $R_{11}$ are independently selected from straight or branched chain alkyl, hydroxyalkyl or alkoxyalkyl groups of about 1 to about 20 carbon atoms. These chains may also be substituted with another functionality as described above.

Yet another group (or subgroup of the above) which comprise amines preferred in the practice of the present invention are primary, secondary and tertiary aliphatic amines with an amine functionality of about 1–3 which also contain one or more ether or alkoxy linkages. Such materials are sometimes referred to as poly(oxyalkylene)diamines. Ethoxylated or propoxylated materials are particularly preferred. For example, a useful variety of such materials are those manufactured by Texaco Co. and marketed under the Trade Name or designation of "Jeffamines". Such useful materials are typically poly(oxyethylene) or poly(oxypropylene) amine or diamine materials having molecular weights of about 400 to about 2000. These materials typically carry the Jeffamine mark or designation and include a "series" designation of "A"; "M"; "D"; "ED"; and "DU". Many such materials have been found to be useful.

Exemplary amines preferred for use in the present invention include:
2-amino-1-butanol;
4-amino-1-butanol;
2-aminoethanethiol;
2-aminoheptane;
2-amino-1-hexanol;
6-amino-1-hexanol;
allylamine;
2-amino-3-methyl-1-butanol;
2-amino-2-methyl-1,3-propanediol;
2-amino-2-methyl-1-propanol;
2-amino-1-pentanol;
5-amino-1-pentanol;
3-amino-1-propanol;
amylamine;
butylamine;
N,N'-bis(2-aminoethyl)-1,3-propanediamine;
N,N'-bis(3-aminopropyl)-1,3-propanediamine;
1,3-bis(dimethylamino)-2-propanol;
1-[N,N-bis(2-hydroxyethyl)amino]-2-propanol;
N,N'-bis(2-hydroxyethyl)ethylenediamine;
decylamine;
1,4-diaminobutane;
1,10-diaminodecane;
1,12-diaminododecane;
1,7-diaminoheptane;
1,3-diamino-2-hydroxypropane;
3,3'-diamino-N-methyldipropylamine;
1,2-diamino-2-methylpropane;
1,9-diaminononane;
1,8-diaminooctane;
1,5-diaminopentane;
1,2-diaminopropane;
1,3-diaminopropane;
dibutylamine;
3-(dibutylamino)propylamine;
diethanolamine;
diethylamine;
5-diethylamino-2-pentanol;
3-(diethylamino)-1,2-propanediol;
1-diethylamino-2-propanol;
3-diethylamino-1-propanol;
3-diethylaminopropylamine;
diethylenetriamine;
N,N-diethylethanolamine;
N,N-diethylethylenediamine;
N,N-diethylmethylamine;
N,N'-diethyl-1,3-propanediamine;
diisobutylamine;
diisopropanolamine;
diisopropylamine;
2-(diisopropylamino)ethanol;
3-diisopropylamino-1,2-propanediol;
N,N-diisopropylethylamine;
1-dimethylamino-2-propanol;
3-dimethylamino-1-propanol;
3-dimethylaminopropylamine;
1,3-dimethylbutylamine;
3,3-dimethylbutylamine;
N,N-dimethylethanolamine;
N,N-dimethylethylamine;
N,N-dimethylethylenediamine;
N,N-dimethyl-N'-ethylethylenediamine;
N,N'-dimethyl-1,6-hexanediamine;
2,5-dimethyl-2,5-hexanediamine;
1,5-dimethylhexylamine;
2,2-dimethyl-1,3-propanediamine;
(±)-1,2-dimethylpropylamine;
dipropylamine;
dodecylamine;
ethanolamine;
3-ethoxypropylamine;
ethylamine;
2-(ethylamino)ethanol;
N-ethylbutylamine;
2-ethylbutylamine;
N-ethyldiethanolamine;
ethylenediamine;
hexamethylenediamine;
1,6-hexanediamine;
hexylamine;
isoamylamine;
isopropylamine;
N-isopropylethylenediamine;
N'-isopropyl-2-methyl-1,2-propanediamine;
N,N,N'-tetramethyl-1,4-butanediamine;
N,N,N',N'-tetramethyldiaminomethane;
N,N,N',N'-tetramethylethylenediamine;
N,N,N',N'-tetramethyl-1,6-hexanediamine;
N,N,N',N'-tetramethyl-1,3-propane-diamine;
N,N,2,2-tetramethyl-1,3-propanediamine;
tributylamine;
tridecylamine;
triethanolamine;
triethylamine;
triisooctylamine;
triisopropanolamine;
trimethylamine;
methylamine;
2-(methylamino)ethanol;
N-Methylbutylamine;
1-methylbutylamine;
2-methylbutylamine;
N-methyldiethanolamine;
N-methylethylenediamine;
N-methyl-1,3-propanediamine;
nonylamine;
octylamine;
tert-octylamine;
propylamine;
2-(propylamino)ethanol;
1-tetradecylamine; and
tris (3-aminopropyl)amine. Mixtures of such materials may also be employed.

Without intending to be bound by theory, the amine, (especially an amino substituted alkanol) is present to further facilitate emulsification of the coating composition.

In a highly preferred embodiment, the amine is an amino-substituted alkanol, and more preferably is 2-amino-2-methyl-1-propanol, e.g., AMP-95. Alternatively, the amino-substituted alkanol may be substituted with a constituent selected from the group consisting of triethylamine, triethanolamine, diethanolamine, dimethylethanolamine; dimethyl-amino-ethanol, or a 2-dimethylamino-2-methyl-1-propanol, and mixtures thereof.

Commercial amino-substituted alkanols suitable for the present invention would include, without limitation AMP-95™, and DMAM P-80™, both manufactured by Angus Chemical.

Highly preferred materials include:
2-amino-2-methyl-1-propanol;
ethanolamine;
dibutylamine;
dimethylethanolamine;
N-ethyldiethanolamine; and
tris-(3-aminopropyl)amine.

Highly preferred poly(oxyalkylene)diamines include Jeffamine M600; D230; D400; D200; ED600; ED900; ED2001; ED4000; ED6000; DU700; T3000, and the like.

Preferably, the amine, such as an amino-substituted alkanol, is present in an amount of about 0.01% to about 10% percent, more preferably about 0.05% to about 5%, and still more preferably about 0.05% to about 3% of the total weight of the final coating composition or system.

The coating compositions and systems of the present invention further include water. Water is preferably present in an amount equal to about 30% to about 95%, more preferably about 50% to 95%, still more preferably about 75% to about 95%, and still more preferably about 90% to about 95%, by weight of the total composition. However, it will be appreciated that the amount of water may be varied to meet the coating properties required for a particular application. For instance, where a more viscous coating is desired, the amount of water may be reduced. The level of water may also be dramatically reduced in order to prepare a concentrate where dilution is intended later.

Preferably, the pH of the final coating composition or system of the preferred embodiments herein is in the range of 7–10.5, and is more preferably about 7.5 to about 9.0.

The compositions of the present invention are preferably substantially free of organic solvents, and especially aromatic organic solvents, e.g., benzene, or substituted benzene materials such as xylene, toluene, and the like. By "substantially free of aromatic organic solvents," as used herein, it is meant that the solvent is present at less than about 5% by weight, more preferably less than about 2.5%, and still more preferably less than about 1%, by weight of the final coating composition. It will be appreciated that this term does not apply to the recurred components of the invention, such as the halogenated polyolefin, glycol, etc, disclosed herein.

It will be appreciated that all of the above-identified materials and ranges are for preferred compositions. The ultimate level of any component may vary according to many factors such as the type, purpose or function of the desired coating, the coating weight, the substrates to be coated, the shape of the article to be coated, the preparation of surface to be coated, and many other factors recognized and understood by the skilled artisan. For example, it may be desirable to prepare a concentrate that would be later diluted with water after shipment or just prior to use. Accordingly, it will be appreciated that the ranges given above will be for the final use composition or system and a concentrate would have correspondingly higher level of the basic components prior to dilution.

While it will again be appreciated that any suitable sequence of processing steps may be employed to prepare the compositions of the present invention, or a concentrate thereof, the following is a preferred method. However, the sequence of steps may be varied under some circumstances. As used herein, the phrase "starting material ratio" refers to the ratio of constituent amounts as measured before any admixing steps have occurred i.e. while all materials are still in an initial starting material state.

A presently preferred composition may be prepared by admixing, using conventional means, a predetermined amount of the polyol, which is preferably a glycol and more preferably ethylene glycol, with a predetermined amount of the surfactant. Preferably the starting material ratio of glycol to surfactant is up to 8:1, and more preferably about 1:1, 1:2 or lower, by weight. The glycol-surfactant admixture is then heated, while under agitation, to a first predetermined temperature, preferably in the range of about 150° F. to about 275° F., and more preferably in the range of 210° F. to about 250° F. In a preferred embodiment, this temperature is slightly greater than the melting point of the chlorinated polyolefin employed in the coating composition.

When the above admixture reaches the predetermined desired temperature, the temperature is then maintained relatively constant and the resin, which is preferably chlorinated polyolefin, is added thereto, optionally under a nitrogen blanket. Preferably the starting materials ratio of chlorinated polyolefin to ethylene glycol is about 11:1.5 to about 1:3, and more preferably about 1:1.63.

To the resulting admixture, a predetermined amount of the amine, which is preferably amino-substituted alkanol, is added. Preferably the starting materials ratio of chlorinated polyolefin to amino-substituted alkanol is about 25:1 to about 40:1.

The components are admixed for about 3 to about 5 minutes in a sealed mixing tank, or alternatively in a reflux condenser.

The chlorinated polyolefin is admixed with the glycol surfactant admixture for an amount of time sufficient to permit the chlorinated polyolefin to melt. The temperature of the admixture is preferably maintained for at least about 10 minutes at a temperature of about 35° F. above the melting point of the chlorinated polyolefin. Thus, the temperature should preferably be maintained at about 205° F. to about 250° F., and more preferably at about 210° F. to about 240° F., again, depending upon the melting point of the chlorinated polyolefin. The admixture then forms a molten mass. At this point, preheated water is added to form an emulsion.

Water is added to the composition in three separate steps. The first step preferably includes adding hot water i.e. water at a temperature of 125° F. to 160° F., in a starting material ratio of chlorinated polyolefin to water of about 2.5:1 to about 4.5:1 and more preferably about 3.4:1. The composition is agitated. As the hot water becomes absorbed into the molten mass, an additional amount of hot water is then added under continued agitation. Preferably the second addition of hot water is added in a starting material ratio of chlorinated polyolefin to water of about 2.5:1.0 to about 4.5:1.0, and more preferably about 3.4:1. At this point an inversion preferably takes place.

Throughout the water additions, the temperature of the materials admixture is preferably maintained at a temperature of about 20° F. above the melting point of the chlorinated polyolefin. Thus, it is maintained at about 165° F. to about 210° F., and more preferably in the range of about 195° F. to about 210° F., depending upon the melting point of the chlorinated polyolefin. To the resulting admixture, and after the second amount of water has been absorbed by the molten mass, a third amount of water is added under increased agitation. Preferably the amount of the third addition of water is sufficient for the addition to have a chlorinated polyolefin to water starting material ratio of about 1:33 to about 1:40, and more preferably about 1:30 to about 1:35. The amount of water preferably yields a final viscosity at room temperature in the range of about 25 to about 50 CPS. The viscosity can be adjusted by changing the amount of water added, or by adding a suitable amount of a thickener to the resulting material. A suitable amount of a filler may also be added to the resulting material. Further, the resulting admixture has a volatile organic content of less than about 5%, and preferably about 3.5%. It is also preferably substantially free of volatile organic solvents or components. In a highly preferred embodiment, the organic volatile content is less than about 0.5%.

The methods of the present invention may also comprise contacting a prepared (e.g., cleaned and dried) olefinic-based surface, such as the surface of a thermoplastic polyolefinic substrate (e.g., polypropylene), with a composition as described above.

The above-described compositions and methods are useful for producing a water-based coating composition suitable for coating a variety of substrates. Without limitation, the compositions are suitable for coating plastics, wood, ceramic, metal, wallboard and the like. Particularly useful applications include coating the present coating compositions onto a plastic substrate such as a polyolefinic substrate, including polypropylene substrates and thermoplastic olefin substrates. The present water-based compositions are especially useful as primer compositions because of their ability to adhere well to heretofore difficult substrates, such as polyolefinic substrates, including polypropylene.

After suitable preparation of a substrate surface, the compositions may be applied to a substrate surface in any suitable manner including, without limitation, spraying, dipping, brushing, rolling, and flow-coating methods.

Moreover, it is contemplated that one or more conventional additives may be included in the present compositions. For instance it is possible that pigment for coloration purposes may be added. Moreover, as indicated above, thickeners such as a functional polyacrylate, available commercially as Alcoqum L-31™, manufactured by Alco Chemical, can be added in suitable proportions to control viscosity and flow of the material. A filler may be employed in suitable proportions in the composition of the present invention, and can be any suitable conventional filler material for plastic materials including, but not limited to calcium carbonate, silicates or the like.

Also, it is possible to add materials, such as carbon black, and conductive pigments, to render the resulting composition conductive for purposes of electrostatic coating application techniques. When an additive that includes carbon black is added to the above-described coating compositions or systems, it is preferred that an additive mixture of carbon black, glycol, surfactant and water is mixed at high speed, dispersed on an apparatus such as a sandmill, and then added to the above-described coating compositions.

More preferably the additive mixture includes about 20% to about 25% by weight carbon black, such as commercially available Cabot XC-72R™, about 15% to about 25% by weight ethylene glycol, about 1% to about 3% by weight of a nonylphenoxy polyethoxy ethanol surfactant, and about 50% to about 65% by weight water. After mixing and grinding, the additive is added to the coating composition in a ratio of approximately 9.5 parts additive to 100 parts emulsion.

ALTERNATIVE PREFERRED EMBODIMENT WITH CARBON BLACK DISPERSION

In a preferred embodiment, the coating compositions and systems of the present invention further include a carbon black dispersion. The carbon black dispersion incorporates (1) a first carbon black concentrate composition, which includes a first adhesion promoter composition and carbon black, admixed with (2) a second adhesion promoter composition, which includes an aqueous admixture of a surfactant, an amine and a resin, preferably a chlorinated polyolefin resin.

The carbon black dispersion of the present preferred embodiment employs the following as the first adhesion promoter composition, expressed as parts by weight (on a dry basis for solids-containing materials):

| Component | Amount | Preferred Amount | More Preferred Amount |
|---|---|---|---|
| Surfactant | about 3 to about 25 parts | about 5 to about 12.5 parts | about 5 parts |
| Amine | about 3 to about 9 parts | about 4 to about 7 parts | about 6.22 parts |
| Resin (preferably a chlorinated polyolefin resin) | about 35 to about 150 parts | about 60 to about 90 parts | about 75 parts |
| Water | about 300 to about 500 parts | about 350 to about 450 parts | about 431 parts |

To obtain the desired first carbon black concentrate composition, approximately 12 to about 25 parts, preferably about 15 to about 22 parts, and more preferably about 19.25 parts of carbon black is added into approximately 40 to about 75 parts, preferably about 55 to about 65 parts, and more preferably about 61.5 parts, of the first adhesion promoter composition. Adjustments are made, such as by additions of suitable amounts of resin, surfactant or both, in order to yield the first carbon black concentrate composition. Preferably, after the adjustments, the first carbon black concentrate composition includes about 40 to about 75 parts, preferably about 55 to about 65 parts, and more preferably about 61.5 parts, of the first adhesion promoter composition; about 12 to about 25 parts, preferably about 15 to about 22 parts, and more preferably about 19.25 parts, of carbon black; and about 15 to about 25 parts, preferably about 15 to about 22 parts, and more preferably about 19.25 parts, of a surfactant-water blend (about 20 percent surfactant in water); and has a total solids content of about 12 to about 45 parts, preferably about 20 to about 40 parts, and more preferably about 37.74 parts, by weight. The solids include about 12 to about 25 parts, preferably about 15 to about 22 parts, and more preferably about 19.25 parts, of carbon black; about 10 to about 25 parts, and more preferably about 14.64 parts, of the resin; and about 1 to about 6 parts, and more preferably about 3.85 parts, of the surfactant. Additionally, a suitable amount (e.g., about 0.1 parts by weight) of a suitable antifoam agent, such as isopropyl alcohol, is incorporated into the first carbon black concentrate composition.

The first carbon black concentrate composition is admixed with a second adhesion promoter composition, which includes the first adhesion promoter composition (or one substantially identical thereto) preferably further diluted with water in the below-indicated amount, and any additional additives employed to yield a final carbon black dispersion. In one preferred aspect, the final carbon black dispersion includes, expressed as parts by weight (on a dry basis for solids-containing materials):

| Component | Amount | Preferred Amount | More Preferred Amount |
|---|---|---|---|
| First adhesion promoter composition | about 325 to about 500 parts | about 350 to about 475 parts | about 450 parts |
| First carbon black concentrate composition | about 20 to about 60 parts | about 30 to about 45 parts | about 42 parts |
| Water | about 325 to about 500 parts | about 350 to about 475 parts | about 430 parts |

In a further preferred embodiment, the final carbon black dispersion also includes a thickener and ammonium hydroxide in the following relative amounts, expressed as parts by weight (on a dry basis for solids-containing materials):

| Component | Amount | Preferred Amount | More Preferred Amount |
|---|---|---|---|
| First adhesion promoter composition | about 325 to about 500 parts | about 350 to about 475 parts | about 450 parts |
| First carbon black concentrate composition | about 20 to about 60 parts | about 30 to about 45 parts | about 42 parts |
| Thickener (e.g., Alcoqum L-31) | about 15 to about 40 parts | about 25 to about 35 parts | about 30 parts |
| Ammonium hydroxide (26°) | about 1 to about 6 parts | about 2 to about 5 parts | about 4 parts |
| Water | about 325 to about 500 parts | about 350 to about 475 parts | about 430 parts |

Examples of suitable surfactants, amines, resins and other additives employed in the first adhesion promoter composition and, thus, employed also in the first carbon black concentrate composition and in the second adhesion promoter composition, have been discussed in detail elsewhere herein. In a present highly preferred embodiment the surfactant is Triton N-101™. Alternatively, it may be a surfactant available from Texaco under the designation N-85 or N-35.1. A preferred amine is dimethylaminoethanol or dimethylethanolamine (DMEA). A preferred resin is a chlorinated polyolefin resin, such as CPO-343-1, supplied by Eastman Chemical Company, Kingsport, Tenn. A highly preferred carbon black is available commercially from Cabot Corporation, Special Blacks Division, under the designation Vulcan XC72R. Of course, other suitable types or sources of material may be employed in accordance with the teachings herein.

In a highly preferred embodiment, which includes a carbon black dispersion, the carbon black dispersion is made by admixing the first adhesion promoter composition and carbon black, shot milling the first adhesion promoter composition and carbon black to result in the first carbon black concentrate composition, and admixing the milled material of the first carbon black concentrate composition with the second adhesion promoter composition. Preferably, milling of the first carbon black concentrate composition begins at a temperature of about 20° to about 30° C., and more preferably about 29° C., and will rise during milling to a temperature of about 35° to about 50° C., and more preferably about 40° C. or higher. The admixture is shot milled, in a suitable mill (e.g., a horizontal shot mill, such as that commercially available from Chicago Boiler Co. (CB Mills Division), under the product name Dyno-Mill) for an amount of time sufficient to achieve a grinding of the carbon black so that about 95% of it could pass through a 10 micron (absolute) filter.

It is observed that a relatively rapid temperature increase in the mill, potentially to as high as about 60° C., takes place during this milling step. The mill optionally is cooled by running kerosene through a jacket enveloping at least a portion of the mill.

Preferably the carbon black is milled for a sufficient time that the desired particle size can be obtained without sacrificing any of the efficacious properties (e.g., its conductivity) of the material. In one embodiment, no more than two passes are employed for milling.

Throughout the present steps, viscosity of the first carbon black concentrate composition is monitored and adjusted through suitable amounts of water additions (to render less viscous) or thickener additions (to render more viscous), in order to maintain a viscosity level of about 13 sec (#3 Zahn). The pH of the admixture is also monitored and controlled to maintain it at about pH 7 to about 10, and more preferably about pH 9.0. The pH can be controlled through additions of sufficient quantities of amine (or even ammonium hydroxide or the like) to render the admixture more basic, or carbon black to render the admixture more acidic.

Optionally, as indicated, suitable amounts of an antifoaming agent may be added to control foaming. Isopropyl alcohol is an example of one such type of agent. It is added in an amount of about 0.1 parts by weight of the first carbon black concentrate composition.

After the first carbon black concentrate composition has been milled for its desired time (for example, for a sample having a total weight of about 150 pounds, a milling time of about 8 minutes is used), it is admixed with the second adhesion promoter composition of the present preferred embodiment. This latter admixing step preferably takes place in a suitable mixing vessel (e.g., a suitable stainless steel or polypropylene vessel), at any suitable temperature, and for a sufficient amount of time to assure a substantially homogeneous admixture. For example, for an admixture of about 3500 pounds, a starting temperature of about 25° C., a time of about 60 minutes is employed. The time of mixing, of course, will vary with such factors as the temperature, the volumes of materials, and the like. Also, during this latter admixing step, water is added in sufficient quantities to obtain the ultimate desired concentration of materials in the resulting adhesion promoter composition.

The resulting preferred carbon black dispersion of the present preferred embodiment can be admixed with the other components of the present compositions and systems by adding the carbon black to the composition (either with or without the polyurethane/acrylic dispersion) and slowly mixing for approximately 10 to 15 minutes, at an ambient temperature. In a preferred embodiment, ammonium hydroxide is then added to control the pH of the composition and a thickener such as L-31 supplied by Alco Chemical is also added.

The preferred primer composition of the present invention, which includes carbon black, can be applied to a substrate and dried using conventional applying and drying techniques, such as, without limitation, those described herein. In a highly preferred embodiment the final primer composition is coated onto a surface of a thermoplastic polyolefin (TPO) article. For coating a typical TPO substrate (which may be a virgin material or even a regrind) a primer thickness of about 0.2 to about 0.4 mil is employed. Smaller or greater thicknesses may be employed. The resulting coated TPO substrate is thereafter further coated.

In a particularly preferred aspect of the present embodiment, the surface of the TPO article coated with the resulting primer composition is further coated with a second layer of material (e.g., a top coat), and then dried at a suitable temperature, for a suitable amount of time (e.g., about 160° F. to about 185° F. for about 30 minutes, for a two-component polyurethane top coat thickness of about 1.5 mils). The second layer of material preferably includes a polyurethane, such as, without limitation, a two-component polyurethane paint system. Resulting coated substrates exhibit excellent paint surface and adhesion characteristics, including surface smoothness, gloss, adhesion, weatherability (e.g., humidity) and thermal cycling.

Without intending to be bound by theory, it is believed that upon molding of articles of typical TPO materials, the surface of the molded article comprises a boundary layer having a substantially high-crystallinity content by comparison with the relatively substantially amorphous nature of the material toward the central portions of the article. The relatively high crystallinity is believed to inhibit adhesion of a coating applied to a surface of the molded article, absent a step of eliminating the boundary layer by high temperature heating (e.g., about 200° F. to about 250° F., for at least two minutes). The present preferred primer composition is believed to interact with and modify the surface characteristics of the aforenoted crystalline boundary layer without the need for a separate high temperature heating step, and thus permits obtainment of a high quality surface finish and excellent adhesion of the primer composition to the molded article even using conventional drying steps (e.g., without limitation, not exceeding a temperature of about 185° F.).

ALTERNATIVE PREFERRED EMBODIMENT WITH POLYURETHANE/ACRYLIC DISPERSION

In one preferred embodiment, the coating compositions and systems of the present invention further include a mixture comprising an acrylic and a polyurethane, more preferably, a polyurethane/acrylic dispersion. The polyurethane/acrylic dispersion preferably uses a low co-solvent level and is externally crosslinked by post addition. The polyurethane/acrylic dispersion is preferably grafted. An example of a preferred polyurethane/acrylic dispersion of the present invention is UPACO WL-305XL supplied by Worthen Industries, Inc., Nashua, N.H., (the technical data sheet for UPACO WL-305XL is herein expressly incorporated by reference) . UPACO WL-305XL contains about 50% solids, has a VOC of about 3%, an aliphatic polyurethane/acrylic co-solvent, and a pH of about 7.5 to about 8.0.

The polyurethane/acrylic dispersion of the present invention is preferably present in an amount of about 10 to about 45 percent, more preferably about 12 to about 40 percent, still more preferably about 14 to about 20 percent, and still more preferably about 14.7 percent of the total weight of the final composition or system.

The polyurethane/acrylic dispersion is admixed with the other components of the present compositions and systems by adding the polyurethane/acrylic dispersion to the composition and mixing at ambient temperature for approximately 10 to 15 minutes. In a preferred embodiment, one or more suitable additives such as ammonium hydroxide is added to control the pH of the composition. A thickener such as a urethane-based or acrylic-based thickener, and in particular, Alcoqum L-31™, supplied by Alco Chemical, Chattanooga, Tenn., may also be added.

APPLICATIONS

Because of the unexpected adhesion characteristics resulting from the composition of the present invention, the composition is particularly attractive in many adhesive applications. By way of illustration, the composition of the present invention may be employed as an adhesive promoter to enhance the adherence of numerous types of materials to other similar or dissimilar materials to form multi-layer articles. One preferred combination of materials includes adhering to a substrate using the composition of the present invention a material selected from acrylics, rubbers, urethanes, epoxies, vinyls or mixtures thereof. A particularly attractive combination of materials for making multi-layer articles includes thermoplastic polyolefin (TPO) adhered to another layer of TPO or to a material such as that containing an acrylic, styrene-butadiene rubber, polyurethane, epoxy, nitrile butadiene rubber, polyvinyl butyral, and mixtures thereof. Further, the composition is useful to bond materials that contain pigment.

In general, for making the above articles, the composition of the present invention is coated or applied to a desired thickness on either of the materials to-be-joined. The materials are then coupled. The resulting articles are baked at a suitable temperature preferably in the range of about 70° C. to about 80° C. for a time sufficient to dry the composition of the present invention (e.g. for about 1 hour or longer).

In a particularly preferred embodiment, to prepare multilayered articles a latex (or emulsion) is prepared, using conventional methods, having as its base material a material containing an acrylic, styrene-butadiene rubber, polyurethane, epoxy, nitrile butadiene rubber, natural rubber, polyvinyl butyral, or mixtures thereof. A substrate is coated with the composition of the present invention. The latex is then applied over the coated substrate, and the entire article is treated as described previously.

In another embodiment the latex and the composition of the present invention described above, are admixed together in suitable proportions prior to coating the substrate. The admixture then is applied to the substrate and can be processed according to the above-outlined steps.

In another particularly preferred embodiment two or more thermoplastic polyolefin substrates are bonded together by using the composition of the present invention as an adhesive, either alone or in combination with other conventional adhesives (e.g. a polyurethane adhesive).

The composition of the present invention also finds utility as a primer for several adhesive systems. That is, when used in combination with known adhesives the resulting materials have improved adhesion characteristics as compared with using such adhesive by itself. In general, for this aspect of the invention, articles to which adhesive is to be applied are first coated with a "primer" layer of the composition of the present invention. The adhesive is then applied to the primer layer and can be bonded to other articles. The adhesive is cured and the primer layer is dried. It may also be possible to admix the adhesive with the composition of the present invention and then apply the resulting admixture to an article to be joined. Preferred adhesive systems for use with the composition of the present invention include those selected from the group consisting of acrylics, epoxies, polyurethanes, silicones, and mixtures thereof.

The compositions of the present invention including a carbon black dispersion, are particularly suitable as primers for thermoplastic polyolefin surfaces. In such embodiment, the carbon black dispersion is particularly useful to obtain superior adhesion results between a primed surface of an article and a top coat or paint coating (more preferably a two-component polyurethane paint system coating) disposed on the primed surface. Particularly preferred two-component polyurethane paint systems are available commercially from any of a variety of suppliers including but not limited to PPG Industries Automotive Products (DMT-DBU is preferred); Morton International Inc. Bee Chemical (2KB-2KC is preferred); and Akzo Coatings Inc.

The coatings and systems of the present invention including the polyurethane/acrylic dispersion are particularly suitable as a weatherable primer.

In another application, the composition of the present invention is useful, by itself, as an adhesive for bonding a substrate to a foam, such as a polyurethane foam (rigid, flexible, or both). Preferably the composition of the present invention is applied to a substrate and before the composition is dry, a polyurethane is foamed in place, using known methods, over the composition of the present invention.

Substrates useful in the above applications include not only substrates of a substantially homogeneous material, but may also include blends or admixtures of materials, reinforced material (i.e., composites) or the like. An example of a particularly attractive reinforced material is a thermoplastic polyolefin substrate reinforced with fiberglass. For instance, without limitation, "glass filled polypropylene" like that supplied, typically in sheet form, by Exxon Corporation under the trade designation TAFFEN, or AZDEL, supplied by AZDEL, INC. is useful.

It should also be noted that the compositions of the present invention can be incorporated into coating formulations such as paints and inks to provide a material suitable for simultaneously priming and coating a substrate surface.

The following examples are illustrative of the described invention.

EXAMPLE I

Ethylene glycol in the amount of 110 grams is admixed with 17 grams of surfactant, such as Triton N-101™. The admixture is heated to 210° F. under agitation. When the product reaches 210° F., 67.5 grams of a chlorinated polyolefinic resin, such as CPO-343-1 (100 percent), is mixed in until the chlorinated polyolefin melts and disperses. The temperature is maintained at about 210° F. for about 10 minutes. At that time, 2.1 grams of an amine, such as a 2-amino-2-methyl-1-propanol (AMP 95™) is added. The mixture is mixed for three to five minutes to increase temperature to 240°–250° F. A hot water supply is heated to about 140° F. and is maintained at about 140° F. throughout the several water additions. Twenty grams of the hot water is added to the admixture at a slow rate. As the hot water becomes absorbed into the molten mass, agitation is increased. Upon absorption of the hot water, 20 additional grams of the hot water from the hot water supply is slowly added to the molten mass. Temperature is maintained at about 200°–210° F. Agitation is increased, and 1970 grains of hot water, from the hot water supply, is added to the admixture.

The coatings are then tested for adhesion by spraying on a polypropylene panel with the above emulsion and drying the coating for a time of about 10 to about 15 minutes at a temperature of about 160° F. to about 165° F. and even as high as about 175° F. The coated surface of the substrate can be coated with a suitable top coat and cured for about 15 minutes at 160° F. and cooled. Substantially similar results using longer times and higher temperatures also are contemplated (e.g. about one hour at about 250° F.). The coated surface is then cross-hatched with a sharp blade and tested with pressure sensitive adhesive tape (3M 610 or equivalent) by firmly pressing the tape over the crosshatched region and then quickly removing the tape. Upon removal of the tape, adhesion to the substrate of about 95% to 100% of the coating is observed. Satisfactory test results are also demonstrated using alternative testing methods of the type including test method GM 9502P, described in a July, 1988 publication by General Motors entitled Engineering Materials and Processes, Procedures Manual; and test method ASTM D3359 B; both of which are expressly incorporated herein by reference.

Substantially similar results may be obtained by variation of the above according to the teachings of the present disclosure. For example, the AMP 95™ may be replaced, in whole or in part, with another form or brand of 2-amino-2-methyl-1-propanol; ethanolamine; dibutylamine; N-ethyldiethanolamine; tris-(3-aminopropyl)amine; dimethylethanolamine triethylamine; diethanolamine; dimethylaminoethanol; 2-dimethylamino-2-methyl-1-propanol; DMAM P-80™; Jeffamine™ M600, D230, D400, D2000, ED600, ED900, ED2001, ED4000, ED6000, DV7000 or T3000; mixtures may also be employed. Thickeners, filler, or both, likewise may be added to the composition in suitable proportions to achieve substantially similar results.

Further, the levels of the various components may be varied. For example, the level of surfactant and/or glycol can be reduced by 5.0%.

The following are two preferred compositions of the present invention which may be made according to the above directions: 25 lbs. ethylene glycol, 25 lbs. Triton N-101™, 100 lbs. CPO-343-1, 6.22 lbs. AMP 95™ and 350 lbs. water; and, 12.5 lbs. ethylene glycol, 25 lbs. Triton N-101™, 100 lbs. CPO-343-1, 6.22 AMP 95™ and 370 lbs. water.

EXAMPLE II

A polyol such as ethylene glycol, a surfactant, an amine and a resin, are mixed for example, in a reactor with two shafts or in a conventional high speed mixer, and heated to about 20° F. above the melting point of the resin, e.g., about 245° F. to about 250° F. When the mixture reaches about 240° F., the mixing is stopped and the admixture is examined to assure a homogenous melt, e.g., clarity and elongation to a fine molten thread, should be observed. A hot water supply is heated to preferably about 165° F. to about 195° F. and is maintained at this temperature throughout the several water additions. The hot water is added to the admixture at a slow rate. As the hot water becomes absorbed into the molten mass, agitation is increased. When the admixture becomes thin, the process is complete.

It will be noted that in one preferred embodiment, the resin is tested prior to use for its ability to be dispersed and emulsified. Those skilled in the art will appreciate that this test may be performed on a small scale, e.g., in a laboratory in a glass vessel.

EXAMPLE III

Multilayer articles are formed that comprise a layer of latex and a thermoplastic polyolefin (TPO) layer or substrate. The latex is coated onto a TPO substrate. Several samples are prepared using different base materials for the latex. Some of the TPO substrates, however, are coated to a thickness of up to about 1 mil, with an intermediate layer between the latex and substrate (i.e., "primer" layer) having the coating composition of Example I, and further containing a thickening agent. Some samples are not coated with the "primer" layer. The articles are baked at about 80° C. for about 1 hour and then aged at about room temperature for about 24 hours. The articles are then tested for adhesion of the latex.

To test the articles, two test methods (X-scribe tape adhesion test and 180° peel strength test—ASTM D903-49) are used. For the X-scribe tape adhesion test, two diagonally intersecting lines of about 5 cm in length are cut, using a sharp razor blade, in the layer of the latex. Permacel brand 703 masking tape is firmly attached to the cut surfaces. The tape (or its equivalent) is then pulled off rapidly, by pulling it back upon itself at any angle of close to about 180°. The "X-cut" area is visually inspected and the adhesion of the latex layer is rated according to the following standards:

| Designation | Observation |
|---|---|
| 5A | No peeling or removal of latex |
| 4A | Trace peeling or removal of latex along incisions |
| 3A | Jagged removal of latex along incisions up to 1.6 mm on either side |
| 2A | Jagged removal of latex along incisions up to 3.2 mm on either side |
| 1A | Removal of latex from most of the area of the "X" under the tape |
| 0A | Removal of latex beyond the area of the "X" |

For tests conducted according to the 180° peel strength test, prior to testing, testing samples are baked overnight (e.g. at least about 12 hours) at about 70° C., rather than baking at about 80° C. for about 1 hour and aging at about room temperature for about 24 hours.

The results are summarized in Table I.

TABLE I*

| Latex Coatings | 180° Peel Strength (lb/in) | | X-Scribe tape adhesion | |
|---|---|---|---|---|
| | With primer | Without primer | With primer | Without primer |
| Acrylics | | | | |
| RES 2301 | 1.1 (A) | 0.8 (A) | 0A | 0A |
| RES 1019 | 14.5 (C) | 2.4 (A) | 5A | 0A |
| A 1052 | 8.1 (C) | 2.1 (A) | 5A | 0A |
| Styrene Butadiene Rubber (SBR) | 15.1 (C) | 1.9 (A) | 5A | 1A |
| polyurethane (PU) | 12.3 (C) | 1.3 (A) | 5A | 1A |
| Epoxy | 7.6 (C) | 5.4 (C) | 0A | |
| Natural Rubber (NR) | 3.2 (C) | 4.3 (A) | 0A | 0A |
| Nitrile Butadiene Rubber (NBR) | 2.1 (C) | 0.5 (A) | 5A | 0A |

TABLE I*-continued

| Latex Coatings | 180° Peel Strength (lb/in) | | X-Scribe tape adhesion | |
|---|---|---|---|---|
| | With primer | Without primer | With primer | Without primer |
| Polyvinyl Butyral (PVB) | 5.6 (C) | 1.3 (A) | 0A | 0A |

*The letters in parentheses indicated that
(A)dhesive damage, or
(C)ohesive bonding is observed.
By adhesive damage it is meant that the tape removes both the adhesive and latex from the substrate.
By cohesive bonding it is meant that latex and primer remain on the substrate after tape removal.

Acrylics RES 2301 and RES 1019 are supplied by Unico Chemical Division. A 1052 is supplied by ICI Chemical Corp.

EXAMPLE IV

An emulsion (referred to in this example as an "adhesion promoter") having the coating composition of Example III is prepared and is admixed with the latex materials of Example III prior to applying to a substrate. The emulsion is added into the latex at about 20% by weight (based on 100% solids of both the latex and emulsion). A thermoplastic polyolefin substrate is coated with the resulting admixture to a thickness of up to about 1 mil. Dried and cured samples are tested and the results are summarized in Table II.

*The letters in parentheses indicates that (A)dhesive damage, or (C)ohesive bonding is observed. By adhesive damage it is meant that the tape removes both the adhesive and latex from the substrate. By cohesive bonding it is meant that latex and primer remain on the substrate after tape removal.

TABLE 2

| Latex | 180° Peel Strength (lb/in) | | X-Scribe tape adhesion | |
|---|---|---|---|---|
| | With adhesion promoter | Without adhesion promoter | With adhesion promoter | Without adhesion promoter |
| Acrylics | | | | |
| RES 2301 | 3.2 (C) | 0.8 (A) | 3A | 0A |
| RES 1019 | 4.1 (C) | 2.4 (A) | 5A | 0A |
| A 1052 | 5.6 (C) | 2.1 (A) | 5A | 0A |
| SBR | 3.5 (C) | 1.9 (A) | 5A | 1A |
| PU | 3.0 (C) | 1.3 (A) | 5A | 1A |
| Epoxy | — | 5.4 (C) | — | 0A |
| NR | 3.5 (A) | 4.3 (A) | 5A | 0A |
| NBR | 3.5 (C) | 0.5 (A) | 5A | 0A |
| PVB | 5.9 (C) | 1.3 (A) | 0A | 0A |

EXAMPLE V

Two articles are prepared for each adhesive system of this example. The articles have a layer of adhesive and a thermoplastic polyolefin substrate. For one of the articles for each adhesive system, a "primer" layer having a thickness of up to about 1 mil and the coating composition of Example III lies between the adhesive and the substrates. For the other article the adhesive lies directly on the substrate, without the "primer" layer. Four adhesive systems are employed and are listed as follows:

(1) acrylic based adhesive (such as that supplied by Boston S.P.A. under the trade designation of Gemini Adhesive);

(2) epoxy-based adhesive (formulated by admixing at about a 1/1 equivalent ratio, D.E.R. 332 bisphenol-type epoxy supplied by Dow Chemical Co., and Ancamine, an aliphatic amine curing agent, supplied by Pacific Anchor Co.);

(3) polyurethane-based adhesive (formulated from a reaction using an aliphatic polyisocyanate (e.g. Desmodur N-100, supplied by Mobay Chemical) as a starting material, which is admixed with an aromatic diamine (e.g. Ethacure 300, supplied by Ethyl Corp.) at an equivalent ratio of about 1/1);

(4) silicone-based adhesive, such as one component room temperature curable RTV silicone rubber adhesive sealant (supplied by GE).

The adhesives are cured, and the test samples are aged at about room temperature for about 24 hours. The samples are then tested for lap shear strength, according to test method ASTM D 1002. The results are summarized in Table 3.

TABLE 3

| Adhesive System | Lap Shear Strength, psi | |
| --- | --- | --- |
| | With primer | Without primer |
| Acrylic | 295 | 93 |
| Epoxy | 368 | 172 |
| Polyurethane | >574* | 131 |
| Silicone | 115 | 76 |

*The thermoplastic polyolefin panel is observed to be broken, but the adhesive remains in tact.

EXAMPLE VI

The composition of Example III is used as an adhesive for adhering polyurethane foams (both rigid and flexible foams) to a reinforced thermoplastic polyolefin substrate, such as a thermoplastic polyolefin substrate reinforced with fiberglass.

A flexible foam (e.g. having a density of about 4.0 lb/ft$^3$) is made by reacting suitable amounts of Isocyanate #80 (supplied by BASF), Pluracol 380 (from BASF), water, a catalyst such as that supplied by Union Carbide under the trade designation Niax C-174, a catalyst such as that supplied by Air Products under the trade designation Dabco 33LV, diethanolamine, and a silicon surfactant like DC-190 (supplied by Air Products).

A rigid foam (e.g. having a density lower than the flexible foam), is made by reacting suitable amounts of an aromatic polyisocyanate such as PAPI-27 (supplied by Dow Chemical), Pluracol 824 (supplied by BASF), water, dibutyltin dilaurate, such as T-12 (supplied by Air Products), Dabco 33LV and a silicon surfactant such as DC-193 (supplied by Air Products).

Both the flexible and rigid foams are foamed-in-place (using conventional methods) on the reinforced thermoplastic polyolefin substrates. The resulting layers of foam have a thickness of about ½ inch. However, one sample of each foam-type has a "primer" layer, having a thickness of up to about 1 mil and the coating composition of Example III, lying between the foam and the thermoplastic polyolefin substrate.

Figure 1B:
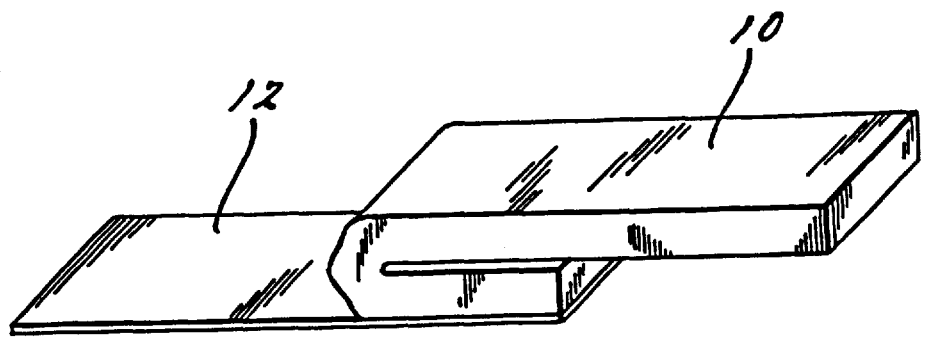

Articles comprising the rigid foam are tested for lap shear strength by a method like test method ASTM D1002 as shown in part (a) of FIG. 1. Articles comprising the flexible foam are tested for 180° peel strength by a method like test method ASTM D903-49, as shown in part (b) of FIG. 1. In FIG. 1 the foam is designated generally by reference numeral 10, and the substrate by reference numeral 12. FIG. 1 illustrates how the samples are tested by showing results of force that is applied to test the samples.

TABLE 4

| | With primer | Without primer |
| --- | --- | --- |
| Rigid foam | | |
| Lap shear strength (psi) | 25.9 | 13.0 |
| Flexible foam | | |
| 180° peel strength (psi) | 6.6 | (adhesive strength too weak to test) |

EXAMPLE VII

Two types of polypropylene sheets (one with pigment, and one without) each having dimensions of about 1 inch by about 6 inches by about 0.04 inches thickness are coated with a primer layer having a thickness of up to about 1 mil and the coating composition of Example III, and are then baked at about 75° C. for about 30 minutes. The polypropylene sheets are then bonded together using the polyurethane adhesive of Example V. The adhesive is cured by baking at about 70° C. for about 30 minutes. The samples are then aged at about room temperature for about 24 hours and are tested for lap shear strength by a method like test method ASTM D1002. The results are summarized in Table 5.

TABLE 5

| Sample | Type of Sheets | Lap Shear Strength, psi | Imperfections Observed |
| --- | --- | --- | --- |
| 1 | Polypropylene Sheets without primer | 14.7 | Adhesive not intact |
| 2 | Polypropylene Sheets with primer | >72 | Sheet deformed only; adhesive intact |
| 3 | Polypropylene Sheets (2% pigment) without primer | 14.1 | Adhesive not intact |
| 4 | Polypropylene Sheets (2% pigment) with primer | >54 | Sheet deformed only; adhesive intact |

EXAMPLE VIII

Surfactant, such as Triton N-101™, in the amount of 17 grams is heated to 210° F. under agitation. When the product reaches 210° F., 67.5 grams of a chlorinated polyolefinic resin, such as CPO-343-1 (100 percent), is mixed in until the chlorinated polyolefin melts and disperses. The temperature is maintained at about 210° F. for about 10 minutes. At that time, 2.1 grams of an amine, such as a 2-amino-2-methyl-1-propanol (AMP 95™) is added. The mixture is mixed for three to five minutes to increase temperature to 240°–250° F. A hot water supply is heated to about 140° F. and is maintained at about 140° F. throughout the several water additions. Twenty grams of the hot water is added to the admixture at a slow rate. As the hot water becomes absorbed into the molten mass, agitation is increased. Upon absorption of the hot water, 20 additional grams of the hot water from the hot water supply is slowly added to the molten mass. Temperature is maintained at about 200°–210° F. Agitation is increased, and 1970 grams of hot water, from the hot water supply, is added to the admixture.

The following is a preferred composition of the present invention which may be made according to the above directions: 25 lbs. Triton N-101™, 100 lbs. CPO-343-1, 6.22 lbs. AMP 95™ and 874.5 lbs. water.

In a preferred embodiment, a polyurethane/acrylic dispersion described above, such as UPACO WL-305XL, is added to the above-described admixture (after the admixture is cooled) and mixed for about 10 to 15 minutes. Ammonium hydroxide is then added to control pH and a thickener such as L-31 is added. The mixture is then mixed for about 20 minutes.

In another preferred embodiment, for example where a highly conductive coating is desired, the carbon black dispersion, described above, is added before the addition of the ammonium hydroxide and thickener. The mixture is slowly mixed for about 10 to 15 minutes at ambient temperature. Ammonium hydroxide and thickener are then added as described above.

In a highly preferred embodiment, containing a carbon black dispersion, the weight of the above components based on total wet weight of the composition is as follows:

Admixture (described above): 67.12%

Polyurethane/acrylic dispersion: 16.55%

Carbon black dispersion (described above): 14.48%

Ammonium hydroxide: 0.12%

Thickener: 1.73%

In a highly preferred embodiment that does not contain a carbon black dispersion, the weight percent of the above components based on total wet weight of the composition is as follows:

Admixture (described above): 78.48%

Polyurethane/acrylic dispersion (described above): 19.35%

Ammonium hydroxide: 0.14%

Thickener: 2.03%

Substantially similar results may be obtained by variation of the above according to the teachings of the present disclosure. For example, as described in Example I, a suitable polyol such as ethylene glycol may be added in accordance with the steps of Example I. Further, the AMP 95™ may be replaced, in whole or in part, with another form, or brand of 2-amino-2-methyl-1-propanol; ethanolamine; dibutylamine; N-ethyldiethanolamine; tris-(3-aminopropyl)amine; dimethylethanolamide triethylamine; diethanolamine; dimethylaminoethanol; 2-dimethylamino-2-methyl-1-propanol; DMAM P-80™; Jeffamine™ M600, D230, D400, D2000, ED600, ED900, ED2001, ED4000, ED6000, DV7000 or T3000; mixtures may also be employed. Thickeners, filler, or both, likewise may be added to the composition in suitable proportions to achieve substantially similar results.

Further, the levels of the various components may be varied. For example, the level of surfactant can be reduced by 50%.

Although the invention has been described with particular reference to certain preferred embodiments, variations and modifications can be effected without deviating from the spirit and scope of the invention as defined in the following claims.

What is claimed is:

1. An aqueous coating composition, comprising:

(a) up to about 40 percent of a polyol;

(b) about 0.5 percent to about 40 percent of a resin selected from halogenated polyolefinic resin materials, halogenated vinyl resins, epihydrin resins, halogenated epoxy resins, and mixtures thereof;

(c) about 0.05 to about 15 percent of a surfactant;

(d) an amine;

(e) an acrylic/polyurethane dispersion; and (f) about 30 to about 95 percent water, wherein said composition is substantially free of aromatic organic solvents.

2. The aqueous coating composition of claim 1, wherein said surfactant is an alkoxylated nonionic surfactant.

3. The aqueous coating composition of claim 1, wherein said surfactant is a nonionic surfactant having about 5 to about 25 ethylene oxide groups per molecule of surfactant.

4. The aqueous coating composition of claim 1, wherein said surfactant is a nonionic surfactant having about 7 to about 10 ethylene oxide groups per molecule of surfactant.

5. The aqueous coating composition of claim 1, comprising from about 3 to about 40 percent polyol.

6. The aqueous coating composition of claim 1, wherein said resin is based on a chlorinated polyolefin resin.

7. The aqueous coating composition of claim 1, wherein said amine is triethylamine.

8. The aqueous coating composition of claim 1, wherein said amine is diethylamine.

9. The aqueous coating composition of claim 1, wherein said amine is selected from the group consisting of 2-amino-2-methyl-1-propanol, triethylamine, triethanolamine, diethanolamine, dimethylethanolamine, 2-dimethylamino-2-methyl-1-propanol, and mixtures thereof.

* * * * *

UNITED STATES PATENT AND TRADEMARK OFFICE
CERTIFICATE OF CORRECTION

Sheet 1 of 2

PATENT NO. : 5,880,190
DATED : March 9, 1999
INVENTOR(S) : Alger E. Laura

It is certified that error appears in the above-identified patent and that said Letters Patent is hereby corrected as shown below:

On the Title Page under Related U.S. Application Data, line 12, after "of" insert -- International Application No. PCT/US90/02005, filed April 18, 1990, which is a continuation-in-part of --.

On page 2 of the Title Page under U.S. Patent Documents, reference 4,567,109, "4,567,109" should be -- 4,567,106 --.

On the Title Page under Foreign Patent Documents, "032861" should be -- 0325861 --.

On the Title Page under Other Publications, line 9, "Eatman" should be -- Eastman --.

On the Title Page under Other Publications, line 13, "Eatman$^{200}$" should be -- Eastman® --.

Column 2, line 15, "halve" should be -- have --.

Column 4, line 56, delete ".".

Column 6, line 46, "$R_3$" should be -- $R_1$ --.

Column 9, line 55, "recurred" should be -- required --.

Column 17, line 65, "grains" should be -- grams --.

Column 19, line 19, "surfaces" should be -- surface --.

UNITED STATES PATENT AND TRADEMARK OFFICE
CERTIFICATE OF CORRECTION

PATENT NO. : 5,880,190
DATED : March 9, 1999
INVENTOR(S) : Alger E. Laura

It is certified that error appears in the above-identified patent and that said Letters Patent is hereby corrected as shown below:

Column 19, line 60, after "polyurethane" should be -- Polyurethane --.

Column 19, line 61, after "5.4 (C)" delete -- OA --.

Column 19, line 61, under the last column insert -- OA --.

Column 20, lines 31-34, delete "*The letters in parentheses indicates that (A)dhesive damage, or (C)ohesive bonding is observed. By adhesive damage it is meant that the tape removes both the adhesive and latex from the substrate. By cohesive bonding it is meant that latex and primer remain on the substrate after tape removal".

Column 23, line 40, "dimethylethanolamide" should be -- dimethylethanolamine --.

Signed and Sealed this

Twentieth Day of June, 2000

Attest:

Q. TODD DICKINSON

*Attesting Officer*  *Director of Patents and Trademarks*